United States Patent
Iline (10) Patent No.: US 6,944,795 B2
(45) Date of Patent: Sep. 13, 2005

(54) METHOD AND APPARATUS FOR STABILIZING GUI TESTING

(75) Inventor: Alexandre S. Iline, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 621 days.

(21) Appl. No.: 10/105,919

(22) Filed: Mar. 25, 2002

(65) Prior Publication Data

US 2003/0182468 A1 Sep. 25, 2003

(51) Int. Cl.[7] .................................................. G06F 11/00
(52) U.S. Cl. ............................ 714/39; 714/38; 717/127
(58) Field of Search .............................. 714/38, 39, 41; 717/127, 129, 131

(56) References Cited

U.S. PATENT DOCUMENTS

| 5,596,714 | A | * | 1/1997 | Connell ........................ 714/38 |
| 5,751,942 | A | * | 5/1998 | Christensen et al. .......... 714/38 |
| 5,790,829 | A | * | 8/1998 | Flynn ........................... 703/17 |
| 5,896,495 | A | * | 4/1999 | Stein et al. .................... 714/38 |
| 5,983,001 | A | * | 11/1999 | Boughner et al. ............. 714/38 |

* cited by examiner

Primary Examiner—Scott Baderman
Assistant Examiner—Joshua Lohn
(74) Attorney, Agent, or Firm—Osha Liang LLP (57) ABSTRACT

A method for stabilizing an event queue during a graphical user interface test includes placing a test event on a tail of the event queue, generating a first empty event associated with the test event, placing the first empty event on the tail behind the test event, processing the test event off a head of the event queue, checking the event queue behind the first empty event for a later event, removing the first empty event if the later event is detected, processing the first empty event off the head of the event queue, and placing a second empty event associated with the test event on the tail of the event queue.

42 Claims, 9 Drawing Sheets

METHOD AND APPARATUS FOR STABILIZING GUI TESTING

BACKGROUND OF THE INVENTION

Figure 1:
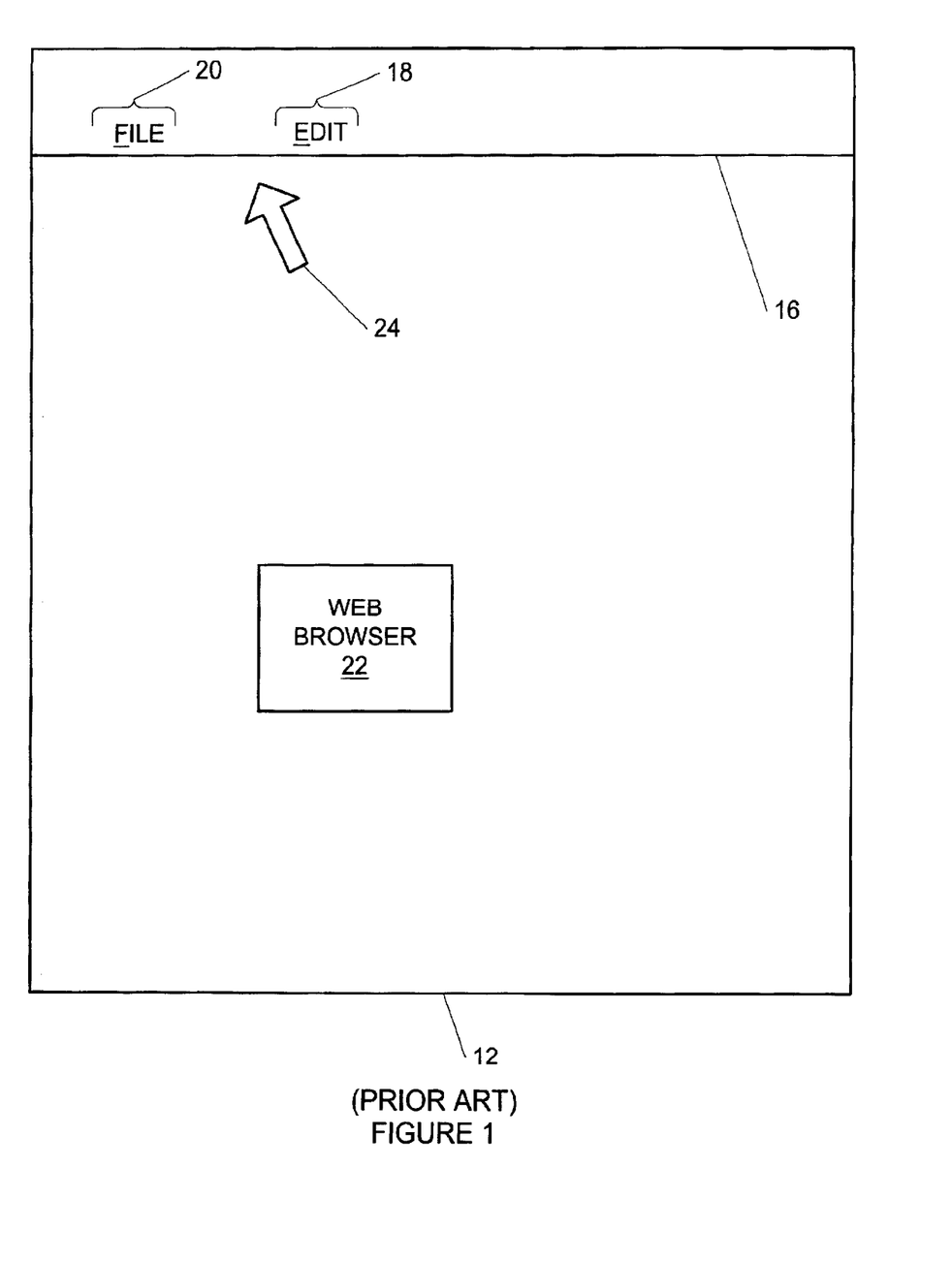
FIG. 1 shows an example of a Graphical User Interface (GUI).

Generally, a Graphical User Interface (GUI) is a software application that interacts with a user via a display device. The GUI may receive input from the user through different input devices, such as a mouse and pointer combination, or a keyboard. FIG. 1 shows a GUI output displayed on a computer monitor screen. The GUI output includes widgets that allow the user to interact with the GUI. Widgets are items such as windows, captions, buttons, labels, menu bars, toolbars, dialog boxes, menus, icons, etc. For example, a window (12) may have a menu bar (16). Further, there are two menus in the menu bar (16), an Edit menu (18) and a File menu (20). Additionally, widgets may represent software applications that are available to be executed by the user, such as a Web Browser widget (22).

Figure 2:
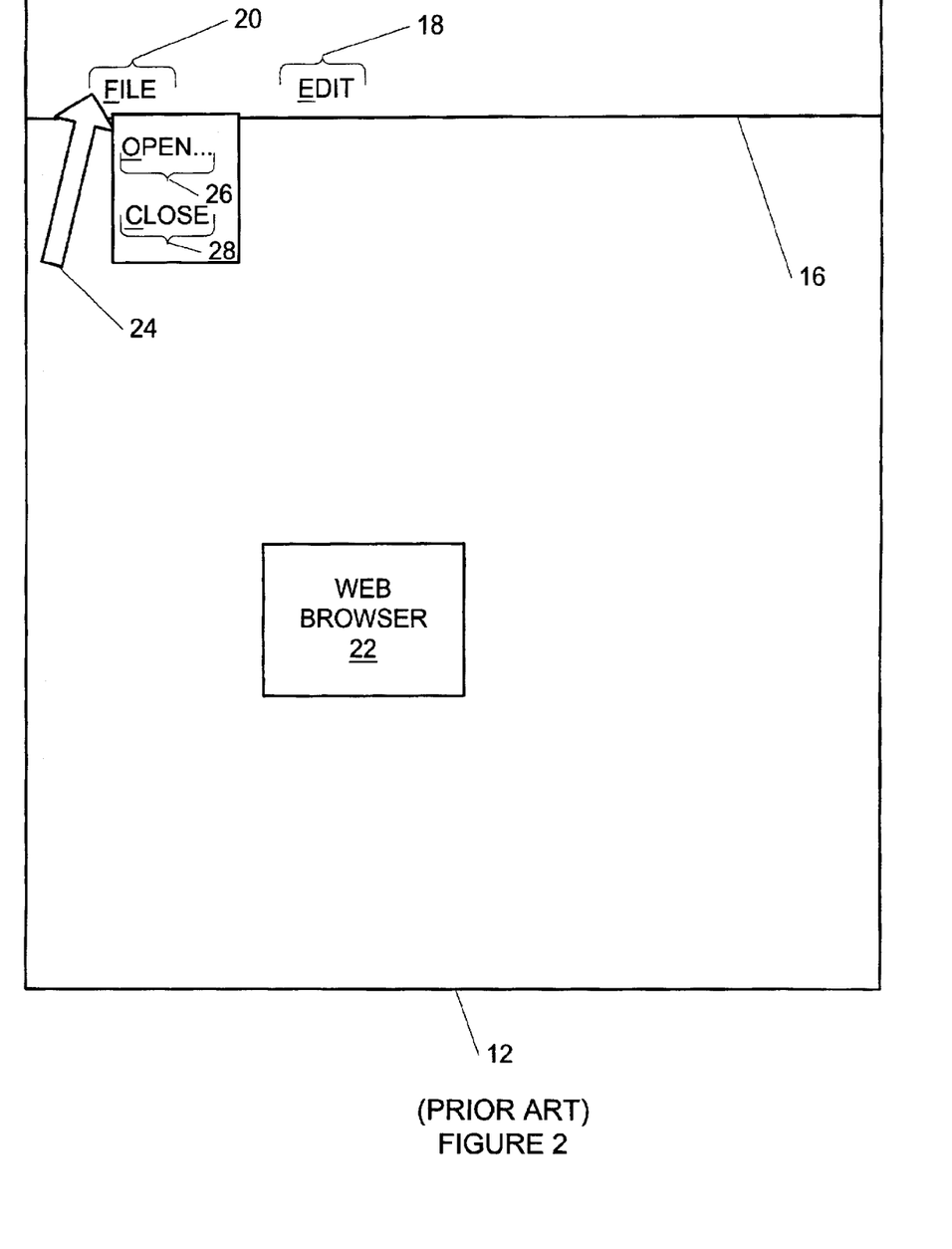
FIG. 2 shows an example of a GUI with an expanded file menu.

When the user interacts with the GUI by, for example, clicking a mouse button while the pointer is positioned above a widget, an event is sent from the mouse to the GUI. The event is a signal transmitted by a computer on which the GUI is executing, and is directed to the GUI. The event may be relayed from the mouse to the GUI by means of a communications framework, e.g., an operating system, a virtual machine, a windowing toolkit, etc. The GUI interprets the event and generates a response based on the position of the pointer when the mouse was clicked. For example, if the user clicks on the File menu (20), an event is sent from the mouse to the GUI, to access the File menu (20) item. The GUI receives the event, interprets the event, and determines that the user wants the File menu (20) to be expanded, and the GUI then alters the graphical interface to reflect the expansion of the File menu (20). The altered graphical interface with the expanded File menu (20) is shown in FIG. 2. The expanded File menu (20) includes an Open item (26) and a Close item (28).

Figure 3:
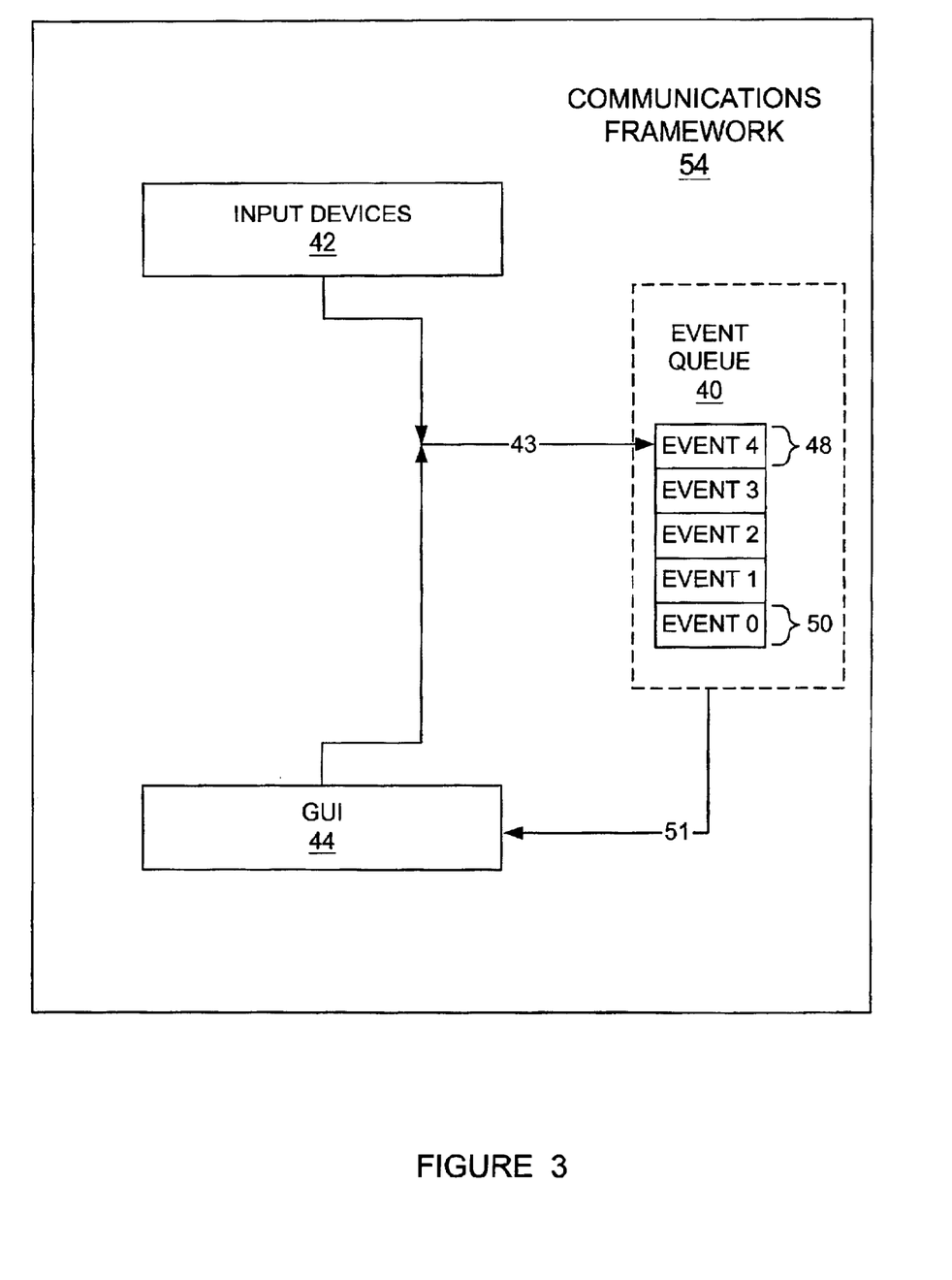
FIG. 3 shows an arrangement of entities involved in relaying user input to a GUI.

As shown in FIG. 3, an event queue (40) receives events from one or more input devices (42) via an event queue input link (43). The input device(s) (42) places an event into the event queue (40) at an event queue tail (48), and the event is released from an event queue (40) via an event queue head (50) and sent to the GUI (44) via a GUI event input link (51). The GUI (44) may send self-events to the event queue (40) via the event queue input link (43). Self-events may be sent from a GUI to an event queue in the course of normal operations. For example, referring to FIG. 1, in the course of drawing a dialog box, a GUI may send self-events to an event queue. A communications framework (54) provides the ability for the entities depicted in FIG. 3 to communicate.

Figure 4:
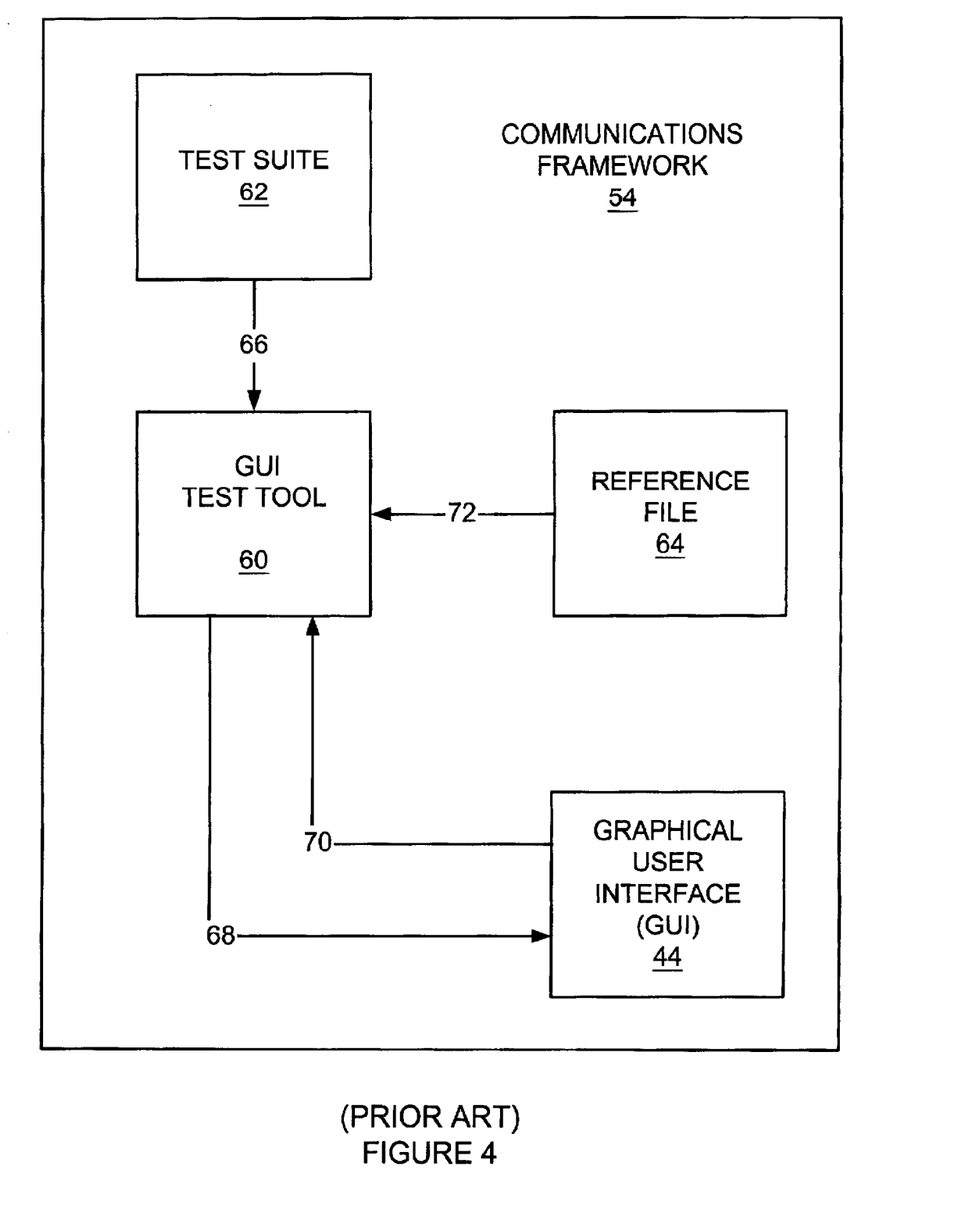
FIG. 4 shows an arrangement of entities involved in testing a GUI.

In order to test a GUI during development, test events may be sent from a GUI Test Tool to a GUI. As shown in FIG. 4, a GUI Test Tool (60) is a software application that may be used to perform a test of a GUI (44) in order to detect errors in the design, construction, and operation, etc., of the GUI (44). In order to test the GUI (44), the GUI Test Tool (60) typically operates in conjunction with a test suite (62), a reference file (64), and a communications framework (54). The test suite (62) is a document that is a collection of one or more tests used to determine whether the GUI (44) is functioning as specified. A test typically contains one or more test events to be sent to the GUI (44) during testing. The test events are designed to exercise one or more features of the GUI (44) by simulating user input. For example, the test event "SelectMenuItem (FileMenu)" simulates a user selecting the File menu. A test (66) from the test suite (62) is read into the GUI Test Tool (60), which subsequently generates a corresponding test event (68). The test event (68) is then sent to the GUI (44). The GUI (44) generates a response (70) to the test event (68), and the GUI Test Tool (60) acquires and evaluates the response (70) to determine whether the response (70) is proper. In order to determine whether the response (70) is proper, the GUI Test Tool (60) may refer to a reference file (64) that includes a proper response for particular test events. The GUI Test Tool (60) may compare the proper response with a post-response widget hierarchy (i.e., a system mapping of the hierarchy of the widgets within a graphical interface) of the GUI (44). Alternatively, the GUI Test Tool (60) may use other means, such as bitmap comparisons, in order to determine whether the response (70) is proper. Typically, proper responses are gathered prior to testing and stored in the reference file (64) for future use, i.e., GUI testing during development.

In the course of testing a GUI, test events may be sent from a GUI Test Tool to a GUI via various mechanisms. In certain circumstances, test events sent to a GUI from a GUI Testing Tool, may be sent to individual widgets associated with the GUI. Commonly, this approach increases probability of generating errors during the GUI testing. For example, a GUI Testing Tool may send a first test event to cause a File menu to expand. The expanded File menu (20) is shown in FIG. 2. Accessing the Open item (26) within the expanded File menu (20) causes a dialog box (not shown) to appear. In order to access the Open item (26), the GUI Test Tool may send a second test event to the Open item (26). However, if, when the second test event is sent to the Open item (26), the first test event has not been completed by the GUI, the second test event may produce an error. The error is caused by sending the second test event to Open item (26), which had not yet been fully drawn.

Figure 5:
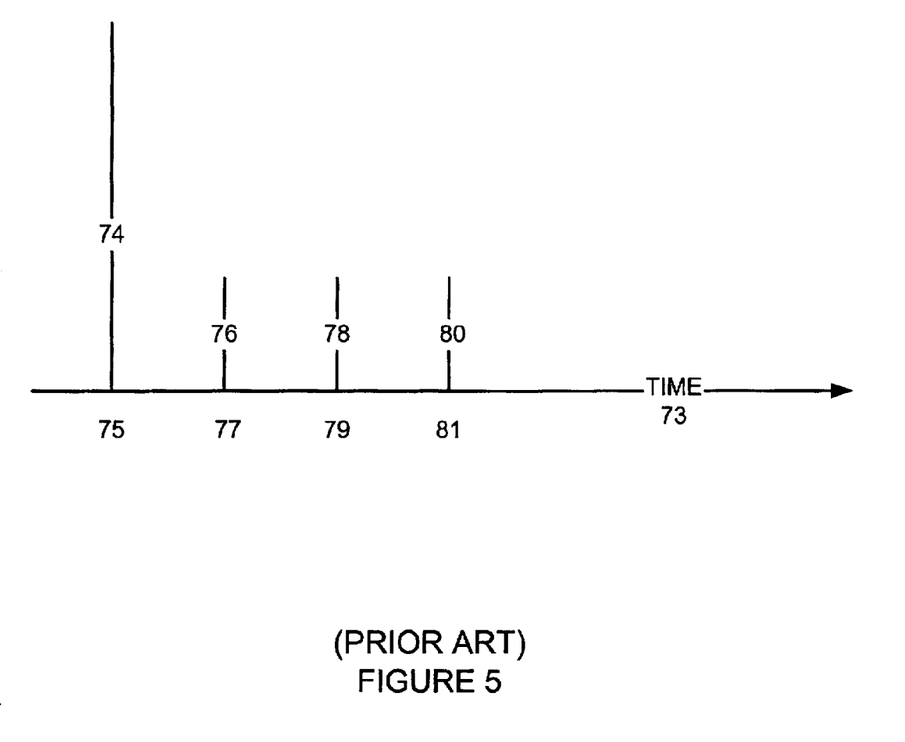
FIG. 5 shows a timeline involving an event sent to a GUI and subsidiary events.

FIG. 5 shows a time sequence involving an event directed to a GUI. The timeline (73) proceeds chronologically from left to right. A first event (74), at time T1 (75), may be, for example, a test event directed to a File menu. A second event (76), at time T2 (77), a third event (78), at time T3 (79), and a fourth event (80), at time T4 (81), are subsidiary events, sent from the GUI to an event after the GUI has received an event. In this example, subsidiary events, i.e., second event (76), third event (78), etc., are self events that may be sent from a GUI to an event queue at regular chronological intervals while a test event is being processed.

Referring to the foregoing example, until the File menu is fully drawn (expanded), the GUI may send subsidiary events at regular chronological intervals to the event queue. The amount of time needed for a GUI to complete processing a test event may vary due to system loading or other factors. When the File menu is fully expanded, the GUI may stop sending subsidiary events to the event queue. Subsidiary event intervals (e.g., the time period between T2 (77) and T3 (79)) may vary according to the particular GUI and/or the particular event that precipitates the subsidiary events. Furthermore, the GUI may also send subsidiary events to the event queue at irregular chronological intervals. Additionally, events, such as system calls, may be sent to the event queue by the communications framework or from other software applications.

SUMMARY OF INVENTION

In general, in one aspect, the invention relates to a method for stabilizing an event queue during a graphical user interface test. The method comprises placing a test event on a tail of the event queue, generating a first empty event associated with the test event, placing the first empty event on the tail behind the test event, processing the test event off a head of the event queue, checking the event queue behind the first empty event for a later event, removing the first empty event if the later event is detected, processing the first empty event off the head of the event queue, and placing a second empty event associated with the test event on the tail of the event queue.

In general, in one aspect, the invention relates to a method for stabilizing an event queue during a graphical user interface test. The method comprises placing the test event on a tail of an event queue, calculating an event time interval, generating a first empty event associated with the test event, placing the first empty event on the tail behind the test event, processing the test event off a head of the event queue, checking the event queue behind the first empty event for a later event, locking the event queue for the event time interval, if the later event is not detected and the test event is at the head of the event queue, unlocking the event queue if the later event is detected behind the first empty event, unlocking the event queue if no later event is detected behind the first empty event and the event time interval has expired, processing the first empty event off the head of the event queue, and placing a second empty event associated with the test event on the tail of the event queue.

In general, in one aspect, the invention relates to a graphical user interface testing stabilization system. The graphical user interface testing stabilization system comprises a graphical user interface, an event queue sending an event to the graphical user interface, a graphical user interface test tool sending the event to the event queue, and a communications framework operatively connecting the graphical user interface, the graphical user interface test tool, and the event queue.

In general, in one aspect, the invention relates to a computer system for stabilizing an event queue during a graphical user interface test. The computer system comprises a processor, a memory, and software instructions stored in the memory for enabling the computer system under control of the processor, to perform placing a test event on a tail of the event queue, generating a first empty event associated with the test event, placing the first empty event on the tail behind the test event, processing the test event off a head of the event queue, checking the event queue behind the first empty event for a later event, removing the first empty event if the later event is detected, processing the first empty event off the head of the event queue, and placing a second empty event associated with the test event on the tail of the event queue.

In general, in one aspect, the invention relates to a computer system for stabilizing an event queue during a graphical user interface test. The computer system comprises a processor, a memory, and software instructions stored in the memory for enabling the computer system under control of the processor, to perform placing the test event on a tail of an event queue, calculating an event time interval, generating a first empty event associated with the test event, placing the first empty event on the tail behind the test event, processing the test event off a head of the event queue, checking the event queue behind the first empty event for a later event, locking the event queue for the event time interval, if the later event is not detected and the test event is at the head of the event queue, unlocking the event queue if the later event is detected behind the first empty event, unlocking the event queue if no later event is detected behind the first empty event and the event time interval has expired, processing the first empty event off the head of the event queue, and placing a second empty event associated with the test event on the tail of the event queue.

In general, in one aspect, the invention relates to an apparatus for stabilizing an event queue during a means for graphical user interface test. The apparatus comprises means for placing a test event at a tail of the event queue, means for generating a first empty event associated with the test event, means for placing the first empty event on the tail of the event queue, means for processing the test event off a head of the event queue, means for checking the event queue behind the first empty event for a later event, means for removing the first empty event if the later event is detected, and means for processing the first empty event off the head of the event queue.

In general, in one aspect, the invention relates to an apparatus for stabilizing an event queue during a means for graphical user interface test. The apparatus comprises means for placing the test event on a tail of an event queue, means for calculating an event time interval, means for generating a first empty event associated with the test event, means for placing the first empty event on the tail behind the test event, means for processing the test event off a head of the event queue, means for checking the event queue behind the first empty event for a later event, means for locking the event queue for the event time interval if the later event is not detected and the test event is at the head of the event queue, means for unlocking the event queue if the later event is detected behind the first empty event, means for unlocking the event queue if no later event is detected behind the first empty event and the event time interval has expired, means for processing the first empty event off the head of the event queue, and means for placing a second empty event associated with the test event on the tail of the event queue.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 6:
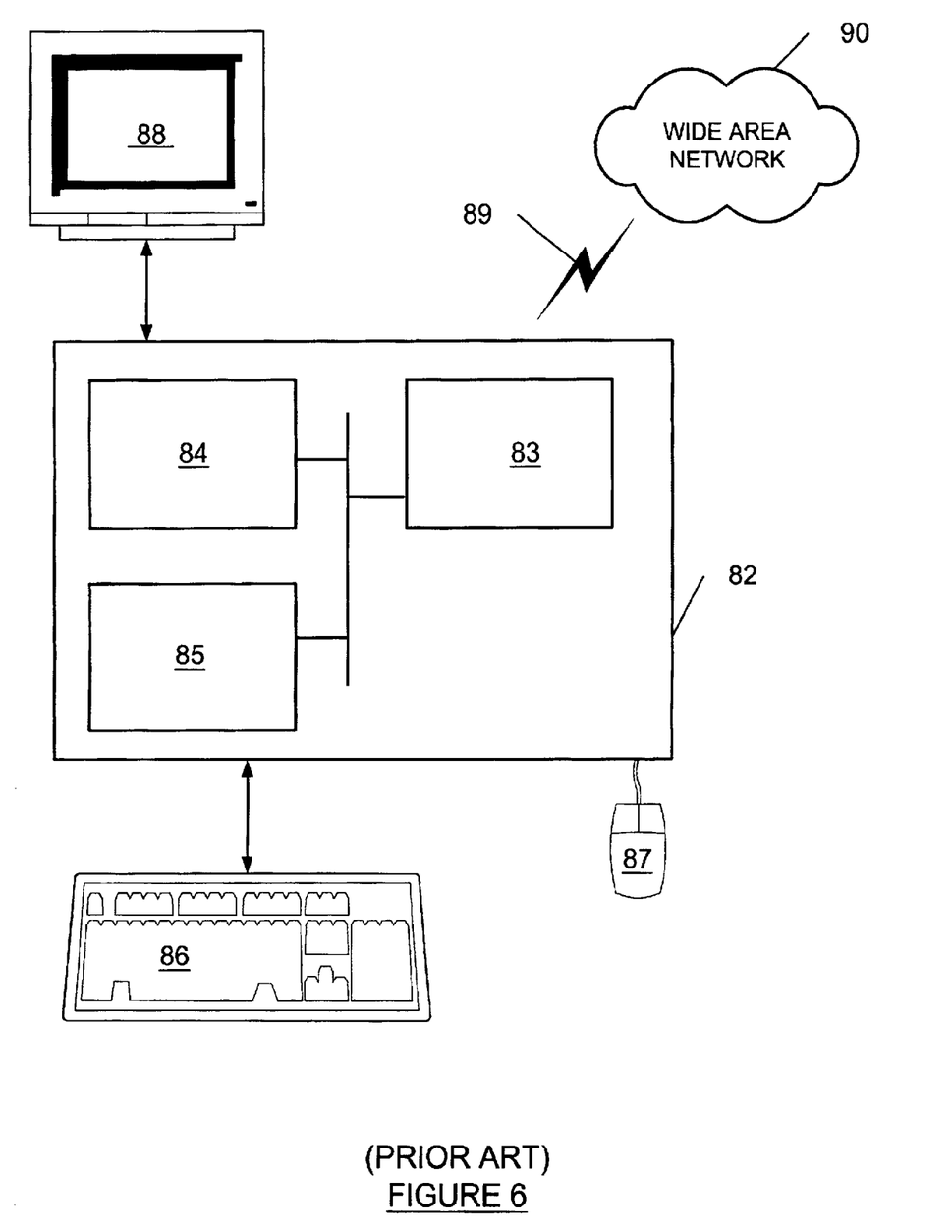
FIG. 6 shows a typical computer system.

The present invention may be implemented on virtually any type computer regardless of the platform being used. For example, as shown in FIG. 6, a typical computer (82) includes a processor (83), associated memory (84), a storage device (85), and numerous other elements and functionalities typical of today's computers (not shown). The computer (82) may also include input means, such as a keyboard (86) and a mouse (87), and an output device, such as a monitor (88). Those skilled in the art will appreciate that these input and output means may take other forms in an accessible environment. The computer (82) is connected via a network connection (89) to a Wide Area Network (WAN) (90), such as the Internet.

The present invention relates to a method for stabilizing a GUI testing environment. Further, the present invention relates to a method for stabilizing an event queue implementation within the GUI testing environment. Further, the present invention relates to generating empty events to aid in stabilizing a GUI testing environment.

Figure 7:
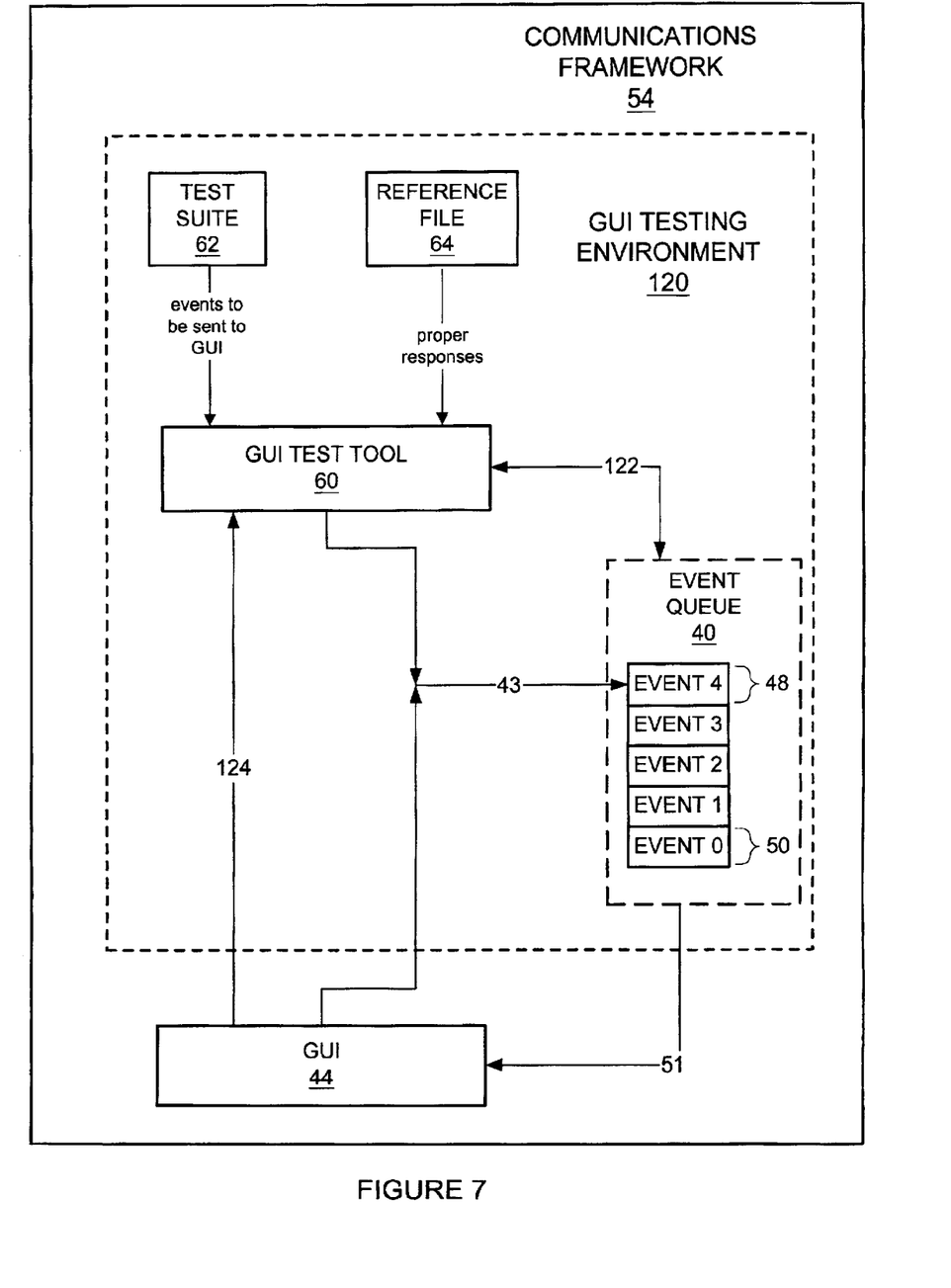
FIG. 7 shows a GUI Testing Stabilization System in accordance with one embodiment of the invention.

A GUI testing environment in accordance with one or more embodiments of the invention is shown in FIG. 7. The GUI testing environment (120) includes a GUI Test Tool (60), a test suite (62), a reference file (64), an event queue (40), an event-queue tail (48), an event-queue head (50), a GUI event input link (51), an event queue input link (43), an event queue communications link (122), and a GUI response link (124). The event queue communications link (122) allows the event queue (40) to send messages and/or test events to the GUI Test Tool (60), and for the GUI Test Tool (60) to send messages and/or test events to the event queue (40). The GUI Test Tool (60) may also control the event queue (40) using the event queue communications link (122). The GUI Test Tool (60) may send test events to the event queue (40) using the event queue input link (43). The GUI Test Tool (60) may acquire a GUI response to a test event using the GUI response link (124).

As shown in FIG. 5 and discussed in the text above, a first event sent to a GUI may initiate a sequence of subsidiary events until the first event is completed (e.g., a first event sent to a GUI in order to expand a file menu). Therefore, in order to determine when a first test event has been completed by a GUI, so that a second test event may be sent to an event queue, the present invention uses an empty test event sent to an event queue. The empty test event includes functionality to assess the status of the queue, such as determine whether other (later) events exist in the queue.

Figure 8:
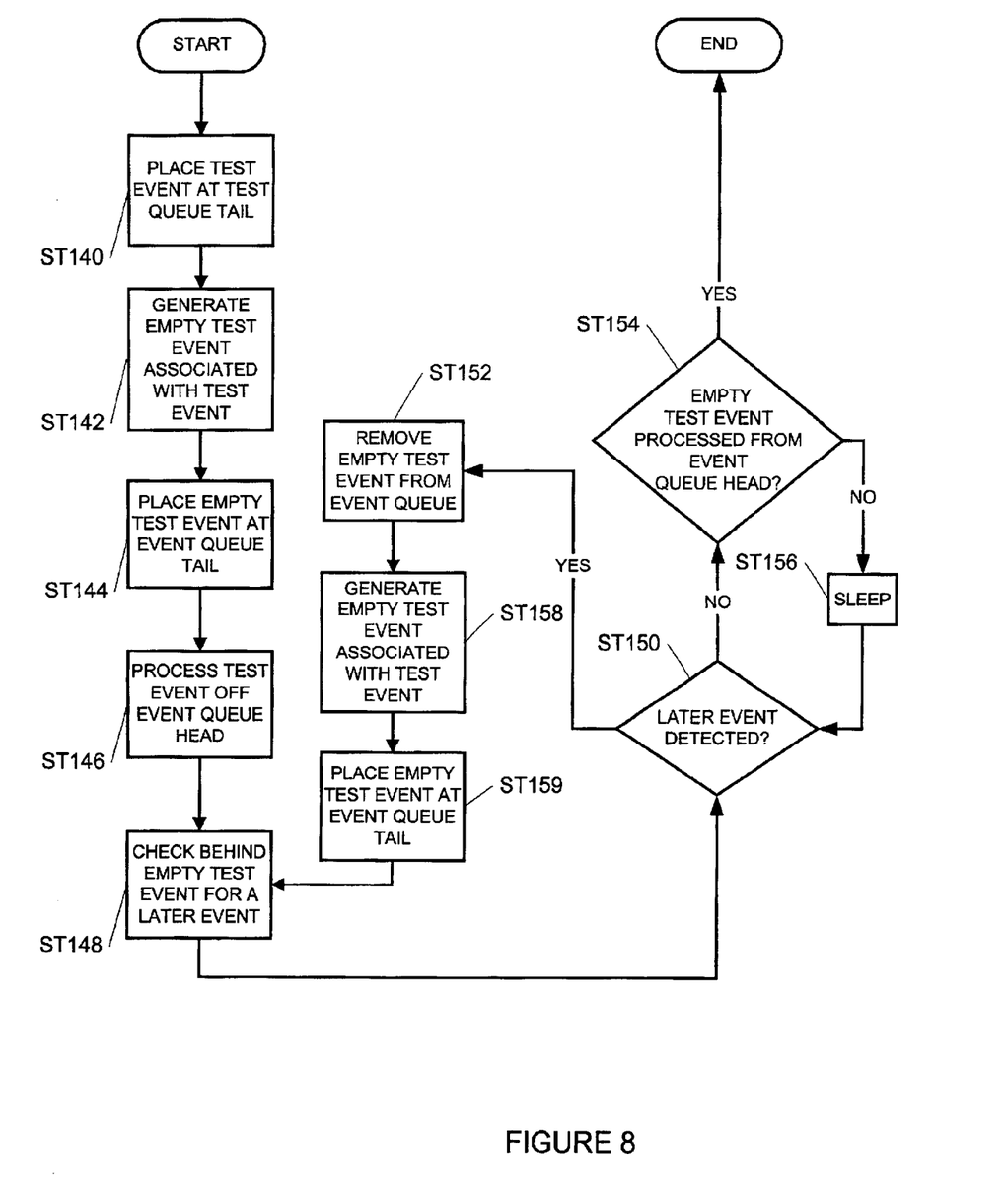
FIG. 8 shows a process by which a GUI Testing Stabilization System determines when a test event has been completed by a GUI in accordance with one embodiment of the invention.

In accordance with one embodiment of the present invention, FIG. 8 shows the typical steps involved in stabilizing a GUI testing environment. A test event is placed on a tail of a test queue (Step 140). An empty test event associated with the test event is generated (Step 142). The empty test event is placed at the tail of the event queue (Step 144). The test event is processed off the head of the event queue (Step 146). A check is performed on the event queue to determine if a later event has been placed on the event queue behind the empty test event (Step 148). The later event may be a subsidiary event, or an event, such as a system call, placed on the queue from a communications framework, or some other software application.

A determination is made whether a later event has been detected on the event queue behind the empty test event (Step 150). If a later event is detected on the event queue behind the empty test event, the empty test event is removed from the event queue (Step 152), another empty test event corresponding to the test event is generated (Step 158), and placed on the event queue (Step 159).

The process then proceeds to step 148. If a later event is not detected on the event queue behind the empty test event, a determination is made whether the empty test event has been processed from the head of the event queue (Step 154). If the empty test event has not processed from the event queue head, the process sleeps for a period of time (Step 156), and proceeds to Step 150. If the empty test event has been processed from the event queue head than steps 140 through 159 may be repeated again for subsequent test events.

One skilled in the art will realize that other embodiments of the present invention may involve different sequences of steps than that shown in FIG. 8. For example, in Step 146, the test event may be processed off the head of the event queue after Step 148.

As shown in FIG. 5, subsidiary events initiated by a GUI response to an event may be sent to an event queue at regular chronological intervals. Thus, if a numerical value associated with a subsidiary event interval is calculated, the GUI Testing environment may determine whether the GUI response is complete by determining that no events are added to the test queue during the subsidiary event interval.

Figure 9:
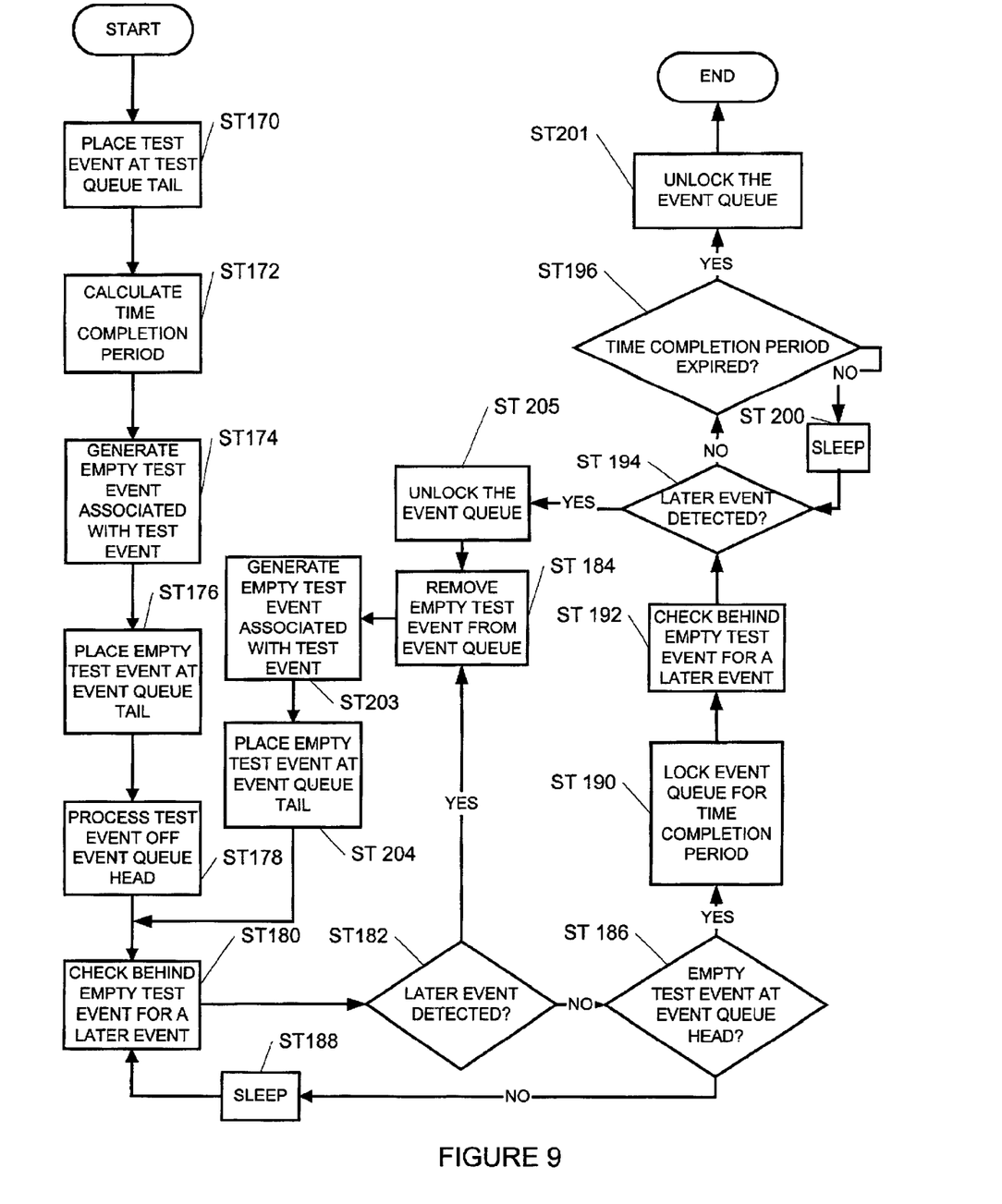
FIG. 9 shows a process by which a GUI Testing Stabilization System determines when a test event has been completed by a GUI in accordance with one embodiment of the invention.

In accordance with another embodiment of the present invention, FIG. 9 shows the typical steps involved in stabilizing a GUI testing environment. A test event is placed at a head of an event queue (Step 170). A time completion period is calculated (Step 172). The time completion period is typically related to the response time of the GUI to the test event. Time completion periods may vary, depending upon the particular GUI and the particular test event.

An empty test event associated with the test event is generated (Step 174). The empty event is placed at the event queue tail (Step 176). The test event is processed off a head of the event queue (Step 178). A check is performed on the event queue to determine if a later event has been placed on the event queue behind the empty test event (Step 180). The later event may be a subsidiary event, or an event, such as a system call, placed on the event queue from a communications framework, or some other software application.

A determination is made whether a later event has been detected on the event queue behind the empty test event (Step 182). If a later event has been detected on the event queue behind the empty test event, the empty test event is removed from the event queue (Step 184). Next, another empty test event corresponding to the test event is generated (Step 203) and placed on the event queue (Step 204).

The process then proceeds to Step 180. If a later event has not been detected on the event queue behind the empty test event, a determination is made whether the empty test event is located at the head of the event queue (Step 186). If the empty test event is not located at the event queue head, the process sleeps for a period of time (Step 188), and proceeds to Step 180. If the empty test event is located at the head of the event queue, the event queue is locked (Step 190). A check is performed on the event queue to determine if a later event has been placed on the event queue behind the empty test event (Step 192).

A determination is made whether a later event has been detected on the event queue behind the empty test event (Step 194). If a later event is detected on the event queue behind the empty test event, the event queue is unlocked (Step 205), and the process proceeds to Step 184. If a later event is not detected on the event queue behind the empty test event, a determination is made whether the time completion period has expired (Step 196). If the time completion period has expired, the event queue is unlocked (Step 201) and Steps 170 through 205 may be repeated again for subsequent test events. If the time completion period is not expired, the event queue sleeps (200). After a predetermined period, the process "awakes" and proceeds to Step 194.

One skilled in the art will realize that other embodiments of the present invention may involve different sequences of steps than that shown in FIG. 9. For example, in Step 178, the test event may be processed off the head of the event queue after Step 180.

Advantages of the present invention include one or more of the following. Provision is made for the ability to determine whether a first test event has been completed by a GUI. Thus, a test of a GUI may be stabilized by lessening the likelihood that a second test event is sent to a GUI before the first test event has been completed by the GUI, thereby enhancing the quality and efficiency of the test of the GUI, thereby decreasing time needed for reviewing of test results. Provision is made for the increasing automation of testing, thereby increasing how much GUI functionality is tested on a regular basis, enhancing discovery of defects and decreasing time needed to fix defects, decreasing time needed for pre-release testing, and thereby allowing for earlier release dates. Increased testing automation makes more time available for complicated, non-obvious test cases, thus enhancing the quality of the GUI. Those skilled in the art appreciate that the present invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for stabilizing an event queue during a graphical user interface test, comprising:
   placing a test event on a tail of the event queue;
   generating a first empty event associated with the test event;
   placing the first empty event on the tail behind the test event;
   processing the test event off a head of the event queue;
   checking the event queue behind the first empty event for a later event;
   removing the first empty event if the later event is detected;
   processing the first empty event off the head of the event queue; and
   placing a second empty event associated with the test event on the tail of the event queue.

2. The method of claim 1, wherein the event queue is resident in a virtual machine.

3. The method of claim 1, wherein the event queue is resident in an operating system.

4. The method of claim 1, wherein the event queue is resident in a windowing toolkit.

5. The method of claim 1, wherein the test event simulates user input.

6. The method of claim 1, wherein the later event is a system call.

7. The method of claim 1, wherein the later event is a subsidiary event associated with the test event.

8. The method of claim 1, wherein the first empty event comprises means for controlling the event queue.

9. The method of claim 1, wherein the second empty event means for controlling the event queue.

10. A method for stabilizing the processing of a test event during a graphical user interface test, comprising:
    placing the test event on a tail of an event queue;
    calculating an event time interval;
    generating a first empty event associated with the test event;
    placing the first empty event on the tail behind the test event;
    processing the test event off a head of the event queue;
    checking the event queue behind the first empty event for a later event;
    locking the event queue for the event time interval, if the later event is not detected and the test event is at the head of the event queue;
    unlocking the event queue if the later event is detected behind the first empty event;
    unlocking the event queue if no later event is detected behind the first empty event and the event time interval has expired;
    processing the first empty event off the head of the event queue; and
    placing a second empty event associated with the test event on the tail of the event queue.

11. The method of claim 10, wherein the event queue is resident in a virtual machine.

12. The method of claim 10, wherein the event queue is resident in an operating system.

13. The method of claim 10, wherein the event queue is resident in a windowing toolkit.

14. The method of claim 10, wherein the test event simulates user input.

15. The method of claim 10, wherein the later event is a system call.

16. The method of claim 10, wherein the later event is a subsidiary event associated with the test event.

17. The method of claim 10, wherein the first empty event comprises means for controlling the event queue.

18. The method of claim 10, wherein the second empty event comprises means for controlling the event queue.

19. A graphical user interface testing stabilization system, comprising:
    a graphical user interface;
    an event queue sending a test event to the graphical user interface;
    a graphical user interface test tool sending the test event to the event queue;
    wherein the test event is placed on a tail of the event queue;
    wherein a first empty event associated with the test event is placed on the tail of the event queue behind the test event;
    wherein the test event is processed off a head of the event queue;
    wherein the first empty event is removed if a later event is present in the event queue behind the first empty event;

wherein the first empty event is processed off the head of the event queue; and wherein a second empty event associated with the test event is placed on the tail of the event queue; and a communications framework operatively connecting the graphical user interface, the graphical user interface test tool, and the event queue.

20. The system of claim 19, wherein the graphical user interface generates a response to the test event.

21. A computer system for stabilizing an event queue during a graphical user interface test, comprising:

a processor;

a memory; and software instructions stored in the memory for enabling the computer system under control of the processor, to perform:

placing a test event on a tail of the event queue;

generating a first empty event associated with the test event;

placing the first empty event on the tail behind the test event;

processing the test event off a head of the event queue;

checking the event queue behind the first empty event for a later event;

removing the first empty event if the later event is detected;

processing the first empty event off the head of the event queue; and placing a second empty event associated with the test event on the tail of the event queue.

22. The computer system of claim 21, wherein the event queue is resident in a virtual machine.

23. The computer system of claim 21, wherein the event queue is resident in an operating system.

24. The computer system of claim 21, wherein the event queue is resident in a windowing toolkit.

25. The computer system of claim 21, wherein the test event simulates user input.

26. The computer system of claim 21, wherein the later event is a system call.

27. The computer system of claim 21, wherein the later event is a subsidiary event associated with the test event.

28. The computer system of claim 21, wherein the first empty event comprises means for controlling the event queue.

29. The computer system of claim 21, wherein the second empty event comprises means for controlling the event queue.

30. A computer system for stabilizing the processing of a test event during a graphical user interface test, comprising:

a processor;

a memory; and software instructions stored in the memory for enabling the computer system under control of the processor, to perform:

placing the test event on a tail of an event queue;

calculating an event time interval;

generating a first empty event associated with the test event;

placing the first empty event on the tail behind the test event;

processing the test event off a head of the event queue;

checking the event queue behind the first empty event for a later event;

locking the event queue for the event time interval if the later event is not detected and the test event is at the head of the event queue;

unlocking the event queue if the later event is detected behind the first empty event;

unlocking the event queue if no later event is detected behind the first empty event and the event time interval has expired;

processing the first empty event off the head of the event queue; and placing a second empty event associated with the test event on the tail of the event queue.

31. The computer system of claim 30, wherein the event queue is resident in a virtual machine.

32. The computer system of claim 30, wherein the event queue is resident in an operating system.

33. The computer system of claim 30, wherein the event queue is resident in a windowing toolkit.

34. The computer system of claim 30, wherein the test event simulates user input.

35. The computer system of claim 30, wherein the later event is a system call.

36. The computer system of claim 30, wherein the later event is a subsidiary event associated with the test event.

37. The computer system of claim 30, wherein the first empty event comprises means for controlling the event queue.

38. The computer system of claim 30, wherein the second empty event comprises means for controlling the event queue.

39. An apparatus for stabilizing an event queue during a means for graphical user interface test, comprising:

means for placing a test event at a tail of the event queue;

means for generating a first empty event associated with the test event;

means for placing the first empty event on the tail of the event queue;

means for processing the test event off a head of the event queue;

means for checking the event queue behind the first empty event for a later event;

means for removing the first empty event if the later event is detected; and means for processing the first empty event off the head of the event queue.

40. The apparatus of claim 39, further comprising:

means for generating a second empty event associated with the test event; and means for placing the second empty event at the tail of the event queue.

41. The method of claim 39, further comprising:

means for calculating an event time interval;

means for locking the event queue for the event time interval;

means for unlocking the event queue at expiration of the event time interval; and means for unlocking the event queue if a later event is detected.

42. An apparatus to stabilize the processing of a test event generated by a graphical user interface test tool, comprising:

means for placing the test event on a tail of an event queue;

means for calculating an event time interval;

means for generating a first empty event associated with the test event;

means for placing the first empty event on the tail behind the test event;

means for processing the test event off a head of the event queue;

means for checking the event queue behind the first empty event for a later event;

means for locking the event queue for the event time interval if the later event is not detected and the test event is at the head of the event queue;

means for unlocking the event queue if the later event is detected behind the first empty event;

means for unlocking the event queue if no later event is detected behind the first empty event and the event time interval has expired;

means for processing the first empty event off the head of the event queue; and means for placing a second empty event associated with the test event on the tail of the event queue.

* * * * *